(12) United States Patent
Senga

(10) Patent No.: US 10,625,453 B1
(45) Date of Patent: Apr. 21, 2020

(54) CLAMPING DEVICE OF INJECTION MOLDING MACHINE

(71) Applicant: FANUC CORPORATION, Yamanashi (JP)

(72) Inventor: Masatoshi Senga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/571,077

(22) Filed: Sep. 14, 2019

(30) Foreign Application Priority Data

Oct. 3, 2018 (JP) .................................. 2018-188013

(51) Int. Cl.
*B29C 45/66* (2006.01)
*B29C 45/68* (2006.01)

(52) U.S. Cl.
CPC .......... *B29C 45/661* (2013.01); *B29C 45/681* (2013.01)

(58) Field of Classification Search
CPC ............................. B29C 45/661; B29C 45/681
See application file for complete search history.

(56) References Cited

U.S. PATENT DOCUMENTS

| 5,178,888 | A   | * | 1/1993  | Wurl ...................... | B29C 45/661 |
|-----------|-----|---|---------|----------------------------|-------------|
|           |     |   |         |                            | 425/451.5   |
| 6,821,105 | B1  | * | 11/2004 | Fischbach ........... | B29C 45/1761 |
|           |     |   |         |                            | 425/214     |
| 9,011,130 | B2  | * | 4/2015  | Senga ..................... | B29C 45/66 |
|           |     |   |         |                            | 425/190     |
| 9,802,350 | B2  | * | 10/2017 | Sasaki .................. | B29C 45/661 |

FOREIGN PATENT DOCUMENTS

JP 2016-013633 A 1/2016

\* cited by examiner

*Primary Examiner* — James P Mackey
(74) *Attorney, Agent, or Firm* — Studebaker & Brackett PC

(57) ABSTRACT

A clamping device includes: a stationary platen; a rear platen; a tie bar; a moving platen; a toggle mechanism connected to both the rear platen and the moving platen and used for making the moving platen advance and retreat; a guide rod having one end fixed to the rear platen and the other end extending toward the moving platen; a guide rod support supported by the tie bar at a supported part and supporting the guide rod at a supporting part; and a crosshead configured to advance and retreat under guidance by the guide rod. The advance and retreat of the crosshead expands and contracts the toggle mechanism to make the moving platen advance and retreat. The guide rod support is provided in such a manner that the supported part is arranged rearward of the supporting part and closer to the rear platen than the supporting part along a center axis.

3 Claims, 4 Drawing Sheets

CLAMPING DEVICE OF INJECTION MOLDING MACHINE

This application is based on and claims the benefit of priority from Japanese Patent Application No. 2018-188013, filed on 3 Oct. 2018, the content of which is incorporated herein by reference.

BACKGROUND OF THE INVENTION

Field of the Invention

The present invention relates to a clamping device of an injection molding machine.

Related Art

An injection molding method (injection molding machine) has conventionally been used in many cases as it can produce moldings of complicated shapes efficiently in large quantity.

An injection molding machine A generally includes a clamping device A1 and an injection device (not shown). As shown in FIG. 3, the clamping device A1 moves a moving platen (moving platform) 2 relative to a stationary platen (stationary platform) 1 for opening, closing, and clamping of molds 3 and 4. The injection device is provided to be movable relative to the stationary platen 1 using a feed mechanism. The injection device injects a molding material such as molten resin into a cavity in the clamped molds 3 and 4 in a pair.

A device generally used as the clamping device A1 is a toggle-type clamping device including a rear platen 5, a plurality of tie bars 6, a crosshead 13, and a toggle mechanism 9 (see Patent Document 1, for example). The rear platen 5 is provided on the opposite side of the stationary platen 1 across the moving platen 2. The tie bars 6 are each provided in such a manner that one end of each of the tie bars 6 is fixedly connected to the rear platen 5 and the other end thereof is fixedly connected to the stationary platen 1. The tie bars 6 penetrate the moving platen 2 and support the moving platen 2 in a manner allowing advance and retreat of the moving platen 2. The crosshead 13 is linked to a ball screw (not shown) through a ball nut, and advances and retreats in response to the rotation of the ball screw. The toggle mechanism 9 makes the moving platen 2 advance and retreat in response to the advance and retreat of the crosshead 13.

The clamping device A1 further includes a plurality of guide rods 15. The guide rods 15 each have one end fixed to the rear platen, and the other end connected to a guide rod support 10 supported by the tie bar 6 in such a manner as to advance and retreat freely. The clamping device A1 is configured to make the crosshead 13 advance and retreat while guiding the crosshead 13 using the guide rods 15.

In the foregoing toggle-type clamping device A1, when a driving device 11 with a servo motor, etc. is driven to rotate the ball screw clockwise or counterclockwise about an axis O1, the crosshead 13 advances and retreats. At the same time, the toggle mechanism 9 is expanded and contracted to make the moving platen 2 advance and retreat. By doing so, the stationary-side mold 3 held by the stationary platen 1 and the moving-side mold 4 held by the moving platen 2 can be opened or closed.

Patent Document 1: Japanese Unexamined Patent Application, Publication No. 2016-13633

SUMMARY OF THE INVENTION

The toggle mechanism 9 is arranged symmetrically with respect to a center axis O2 of the clamping device A1 connecting the centers of the stationary platen 1 and the moving platen 2. Thus, the crosshead 13 advances and retreats along the center axis O2 while being guided by the guide rods 15 in a pair. The guide rods 15 in a pair are arranged symmetrically in a right-left direction perpendicular to the center axis O2 of the toggle mechanism 9. The guide rods 15 are each supported while one end of each of the guide rods 15 is connected to the rear platen 5 and the other end thereof is connected to the guide rod support 10 supported by the tie bar 6 in a manner allowing advance and retreat of the guide rod support 10. The ball screw has one end side connected to the driving device 11 while rotatably supported on the rear platen side, and the other end side supported by the tie bar 6 through the crosshead 13, the guide rod 15, and the guide rod support 10.

In the clamping device A1 having the foregoing configuration, in order to maintain parallelism between respective molding surfaces of the molds 3 and 4 in a pair held by the stationary platen 1 and the moving platen 2 respectively, it is important to prevent position deviations of supporting parts on one end side and the other end side of the guide rod 15 linked to the rear platen 5 and the guide rod support 10 respectively.

However, if the clamping device A1 of the injection molding machine A is to open, close, and clamp the molds 3 and 4 by moving the moving platen 2 relative to the stationary platen 1 in a horizontal transverse direction T1 for example, deflection may be caused by the weight of the tie bar 6 or the weight of the moving platen 2, as shown in FIG. 4. This unintentionally causes a downward deviation of the position of the guide rod support 10 supported by the tie bar 6 in a top-bottom direction T2 from the rear platen 5. This has caused a problem of position deviations of the supporting part, the ball screw and the crosshead 13 on the other end side (tip side) of the guide rod 15, and in turn, position deviations of the molds 3 and 4 in a pair.

In Patent Document 1 mentioned above, a guide support (guide rod support member) 54 is supported by a base (frame) 11 through a support block 56 slidable on the upper surface of the base. This necessitates an additional member such as the support block for supporting the guide rod support slidably, causing a disadvantage that the configuration of a clamping device becomes complicated.

The present invention is intended to provide a clamping device of an injection molding machine capable of favorably reducing a position deviation of a crosshead, and in turn, position deviations of molds in a pair.

The present inventor has found means allowing favorable reduction in a position deviation of a crosshead, and in turn, position deviations of molds in a pair, thereby completing the present invention.

(1) The present invention is intended for a clamping device (clamping device B1 described later, for example) of an injection molding machine (injection molding machine B described later, for example) comprising: a stationary platen (stationary platen 1 described later, for example); a rear platen (rear platen 5 described later, for example); a tie bar (tie bar 6 described later, for example) supported by the stationary platen and the rear platen while extending through the stationary platen and the rear platen, and provided parallel to a center axis (center axis O2 described later, for example) of the clamping device; a moving platen (moving platen 2 described later, for example) configured to advance and retreat under guidance by the tie bar; a toggle mechanism (toggle mechanism 9 described later, for example) connected to both the rear platen and the moving platen and used for making the moving platen advance and retreat; a guide rod (guide rod 15 described later, for example) having one end fixed to the rear platen and the other end extending toward the moving platen; a guide rod support (guide rod support 16 described later, for example) including a supported part (supported part 16a described later, for example) and a supporting part (supporting part 16b described later, for example), supported by the tie bar at the supported part, and supporting the guide rod at the supporting part; and a crosshead (crosshead 13 described later, for example) configured to advance and retreat under guidance by the guide rod. The advance and retreat of the crosshead expands and contracts the toggle mechanism to make the moving platen advance and retreat. The guide rod support is provided in such a manner that the supported part is arranged closer to the rear platen than the supporting part along the center axis.

(2) According to the present invention, in the foregoing (1), the guide rod support may be provided in such a manner that an end surface (end surface 16c described later, for example) of the supported part pointed toward the moving platen is arranged closer to the rear platen than an end surface (end surface 16d described later, for example) of the supporting part pointed toward the rear platen along the center axis.

(3) According to the present invention, in the foregoing (1) or (2), with a center position of a tie bar supporting part (tie bar supporting part 5a described later, for example) along the center axis at which the rear platen supports the tie bar defined as a first position S1, with a center position of the supporting part along the center axis at which the guide rod support supports the guide rod defined as a second position S2, and with a center position of the supported part along the center axis at which the tie bar supports the guide rod support defined as a third position S3, the guide rod support is provided in such a manner that a first distance L1 along the center axis between the second position S2 and the third position S3 is greater than a second distance L2 along the center axis between the first position S1 and the third position S3.

According to the present invention, a clamping device of an injection molding machine is provided that allows favorable reduction in a position deviation of a crosshead, and in turn, position deviations of molds in a pair.

DETAILED DESCRIPTION OF THE INVENTION

Figure 1:
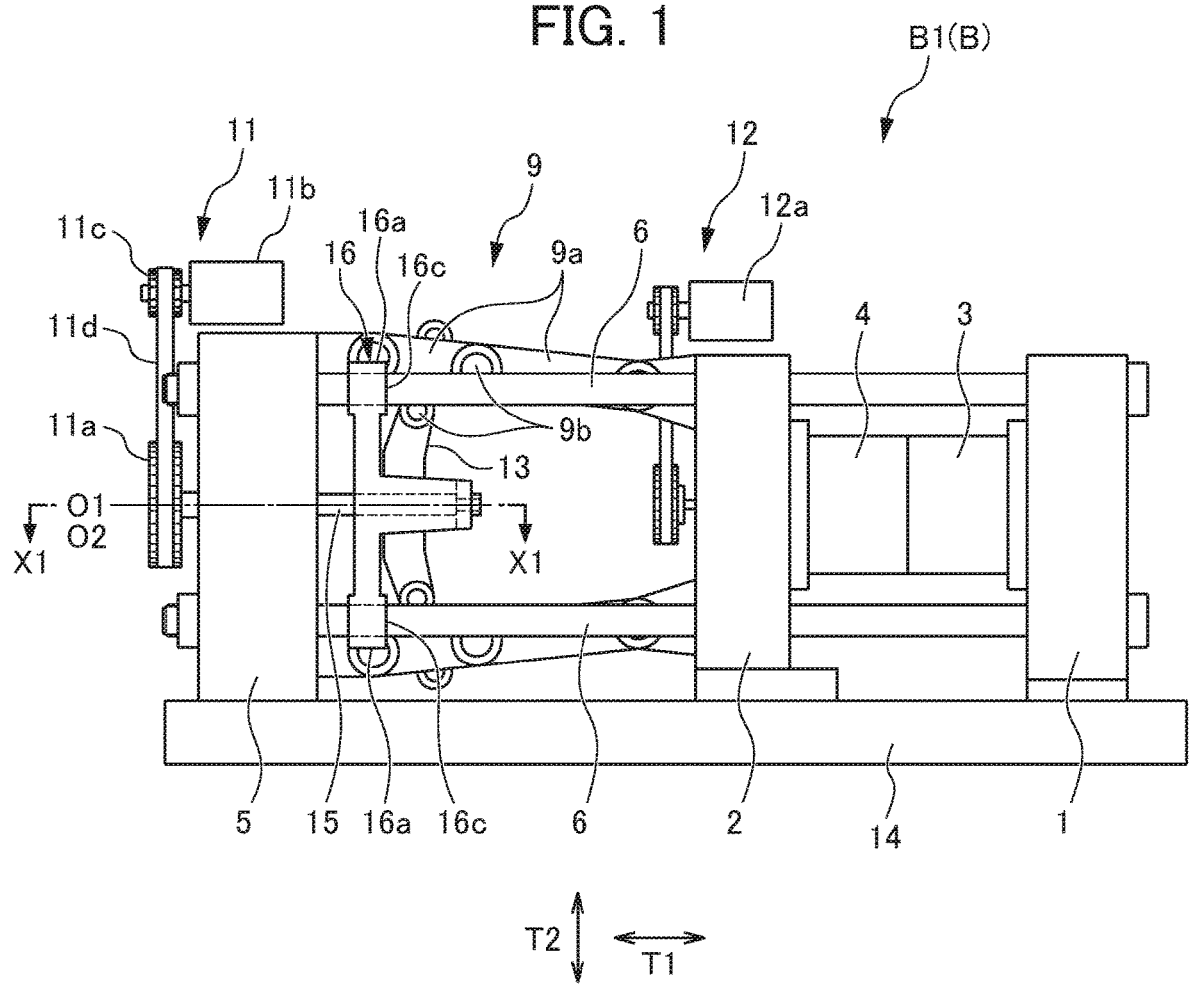
FIG. 1 shows a clamping device of an injection molding machine according to an embodiment of the present invention.

A clamping device of an injection molding machine according to an embodiment of the present invention will be described next by referring to FIGS. 1 and 2.

An injection molding machine B of the embodiment includes a clamping device B1, an injection device (not shown), and an ejection device 12. As shown in FIG. 1, the clamping device B1 opens, closes, and clamps molds 3 and 4 by moving a moving platen 2 relative to a stationary platen 1 frontward and rearward in a horizontal transverse direction T1. The injection device is provided to be movable relative to the stationary platen 1 using a feed mechanism. The injection device injects a molding material such as molten resin into a cavity in the clamped molds 3 and 4 in a pair. The ejection device 12 includes an ejection pin, an ejection driving device 12a, etc. Moldings can be taken out of the molds 3 and 4 using the ejection device 12.

Figure 2:
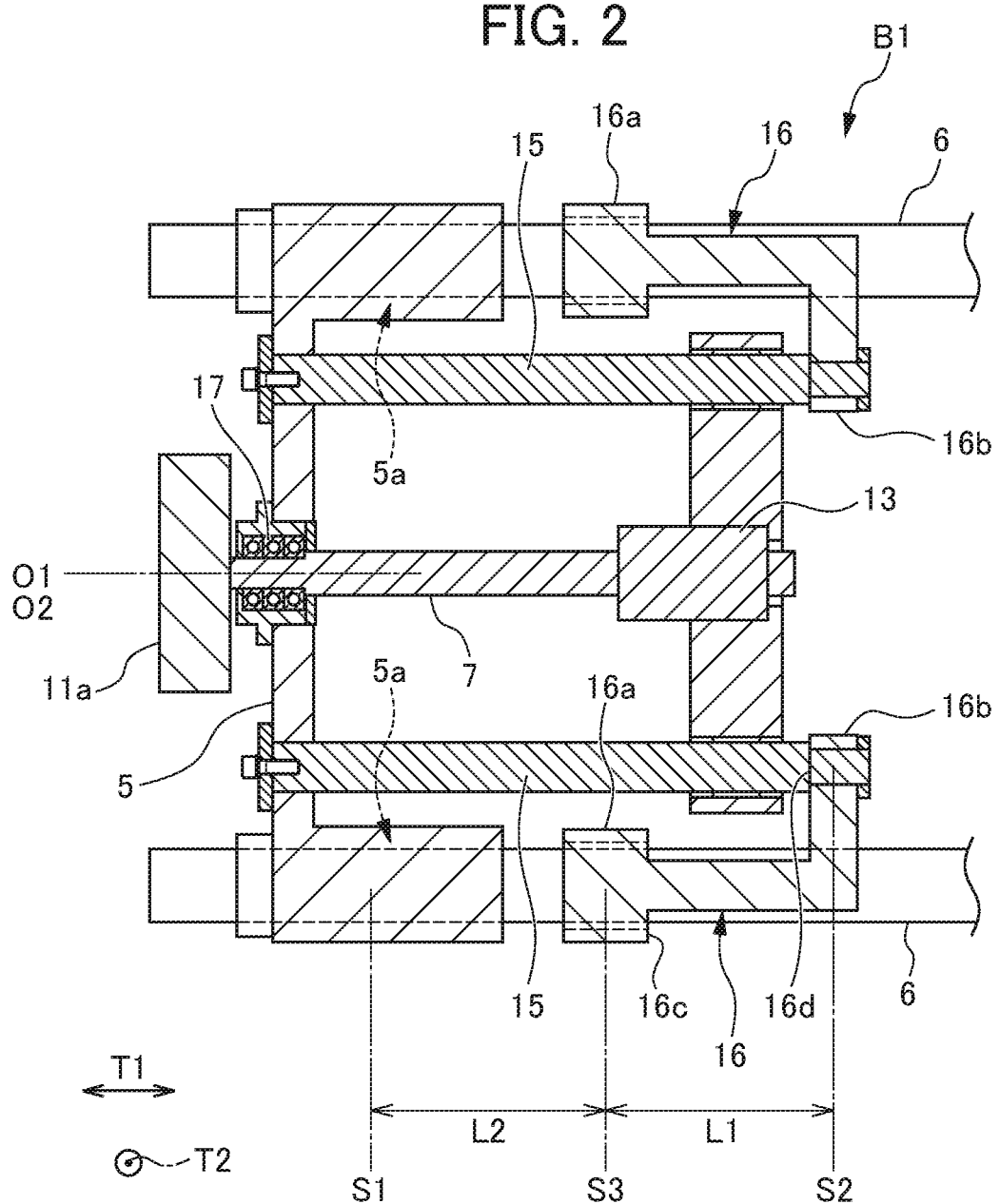
FIG. 2 is a view taken along an arrowed line X1-X1 of FIG. 1.
Figure 3:
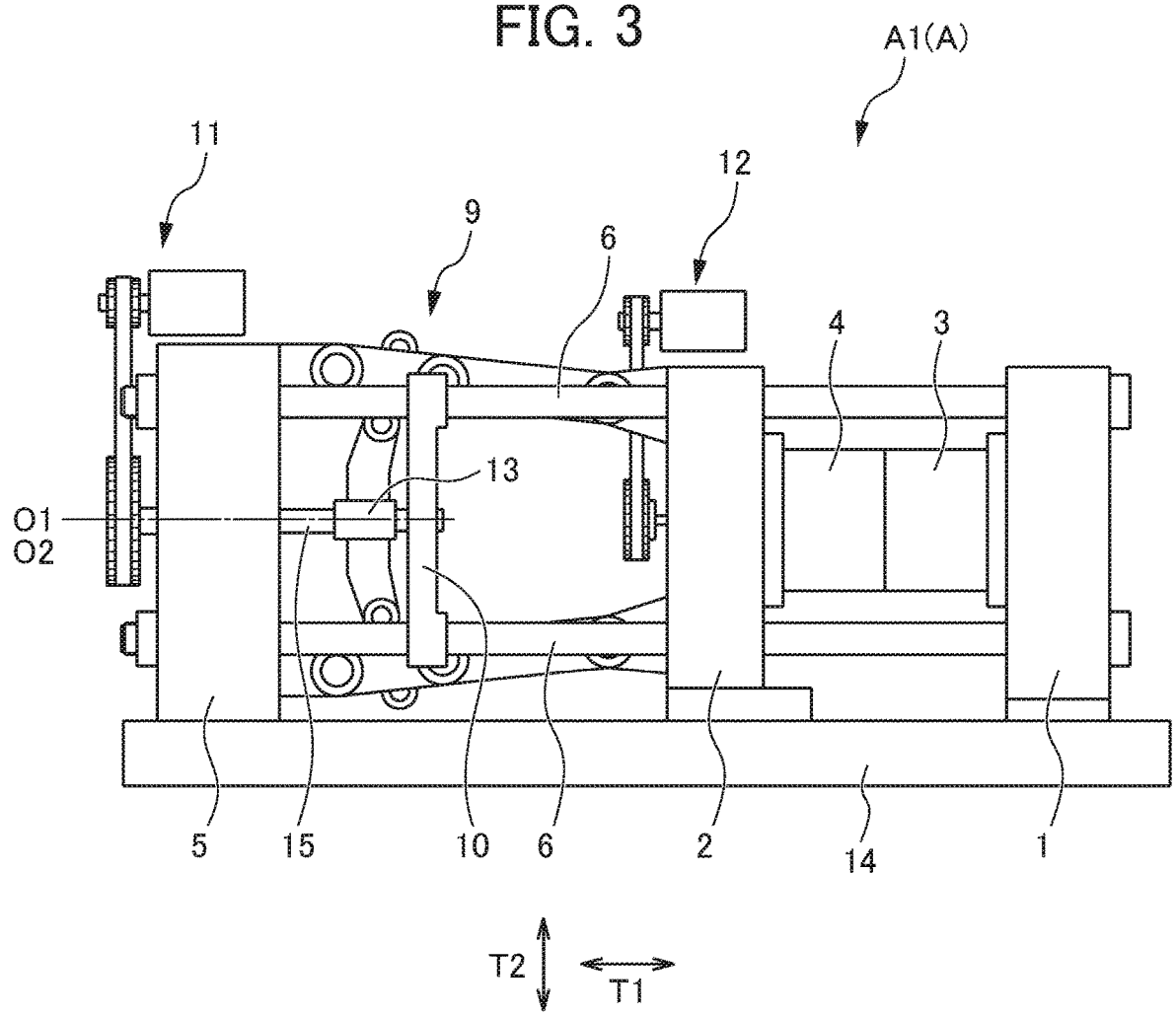
FIG. 3 shows a clamping device of a conventional injection molding machine.
Figure 4:
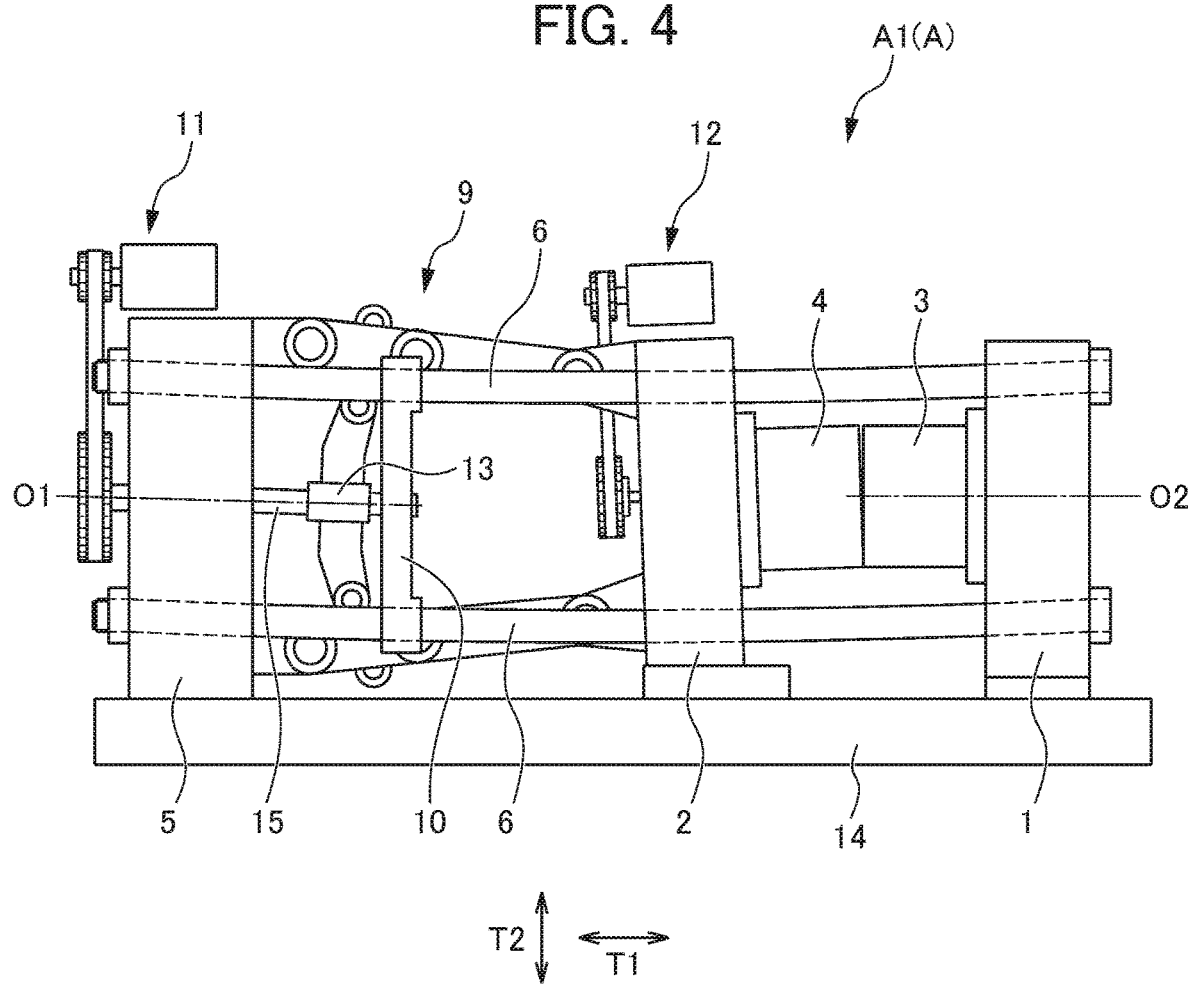
FIG. 4 shows a state in which deflection or displacement occurs at a tie bar and a moving platen of the clamping device of the conventional injection molding machine.

As shown in FIGS. 1 and 2, the clamping device B1 includes a rear platen 5, a plurality of tie bars 6, a crosshead 13, and a toggle mechanism 9. The rear platen 5 is provided on the opposite side of the stationary platen 1 across the moving platen 2. With an axis direction of each of the tie bars 6 pointed in the horizontal transverse direction T1, one end of each of the tie bars 6 is fixedly connected to the rear platen 5 and the other end thereof is fixedly connected to the stationary platen 1. While penetrating the moving platen 2, the tie bars 6 support the moving platen 2 in a manner allowing advance and retreat of the moving platen 2. The crosshead 13 is linked to a ball screw 7 through a ball nut. In response to the rotation of the ball screw 7 about an axis O1, the crosshead 13 advances and retreats frontward and rearward. The toggle mechanism 9 can make the moving platen 2 advance and retreat in response to the advance and retreat of the crosshead 13. The axis of the ball screw 7 is defined as the axis O1, and a center axis of the clamping device B1 connecting the centers of the stationary platen 1 and the moving platen 2 is defined as an axis O2. In this case, in the presence of one ball screw, the ball screw 7 is provided in such a manner that the axis O1 is coaxial with the axis O2. In the presence of two ball screws, the ball screws 7 are provided in such a manner that the axis O1 are symmetric with respect to the axis O2. The axis direction and a front-rear direction agree with an advancing and retreating direction. A side where the stationary platen 1 is arranged is a front side, and a side where the rear platen 5 is arranged is a rear side.

The stationary platen 1 and the rear platen 5 are provided fixedly on a base (machine base) 14. The moving platen 2 is supported by the base 14 and the tie bar 6 in such a manner as to be capable of advancing and retreating frontward and rearward in the transverse direction T1.

The toggle mechanism 9 is a mechanism connected to both the rear platen 5 and the moving platen 2 and used for making the moving platen 2 advance and retreat. The toggle mechanism 9 is configured by connecting a toggle link 9a, a toggle pin 9b, and the crosshead 13 in a manner that allows each the toggle link 9a, the toggle pin 9b, and the crosshead 13 to pivot freely. In response to the clockwise or counterclockwise rotation of the ball screw 7 about the axis O1, the crosshead 13 linked to the ball nut threadedly engaged with the ball screw 7 moves frontward or rearward. Further, as the toggle link 9a pivots at each connecting point to expand and contract the toggle mechanism 9 frontward and rearward in the transverse direction T1, the toggle mechanism 9 amplifies the force of the crosshead 13 to generate force for making the moving platen 2 advance and retreat, and in turn, generate clamping force for clamping the molds 3 and 4 in a pair.

The driving device 11 for rotating the ball screw 7 includes a driven pulley 11a, a driving pulley 11c, and an endless transmission belt 11d. The driven pulley 11a is attached to one end of the ball screw 7 supported on the rear platen 5 with a bearing 17, for example, in such a manner as to be rotatable about the axis O1. The driving pulley 11c is attached to a motor 1ib such as a servo motor, for example, and to a rotary axis of the motor 1ib. The transmission belt 11d is stretched and wound on the driven pulley 11a and the driving pulley 11c. Driving the motor 1ib makes the transmission belt 11d rotate. In response to this, the driven pulley 11a rotates to rotate the ball screw 7 about the axis O1. Then, the crosshead 13 advances and retreats frontward and rearward in response to the rotation of the ball screw 7 to expand and contract the toggle mechanism 9, thereby allowing the moving platen 2 to advance and retreat frontward and rearward.

The clamping device B1 of the embodiment further includes guide rods 15 and a guide rod support 16.

The guide rods 15 each have one end connected to the rear platen 5 and the other end connected to the guide rod support 16. The guide rods 15 are arranged symmetrically on the right side and the left side across the center axis O2 of the clamping device B1 and the axis O1 of the ball screw 7. The crosshead 13 is linked to the right and left guide rods 15 in a pair in such a manner as to advance and retreat freely (to be slidable) frontward and rearward in the transverse direction T1, and is configured to advance and retreat frontward and rearward under guidance by the guide rods 15 in a pair.

The guide rod support 16 is provided in such a manner as to be supported by the tie bar 6 at a supported part 16a and to support the tip of the guide rod 15 at a supporting part 16b.

In the clamping device A1 of the conventional injection molding machine A, the tie bar 6 may deflect downward under its weight slightly (for example, about 0.1 mm or more) between the stationary platen 1 and the rear platen 5, and the occurrence of this deflection may cause downward deviations of the guide rod support and the crosshead. In this case, the moving platen 2 is tilted if a lower link of the toggle mechanism 9 extends in a linear shape while an upper link is still bent, for example, causing deviations of respective molding surfaces of the molds 3 and 4 in a pair.

By contrast, the guide rod support 16 of the embodiment is provided in such a manner that the supported part 16a is formed rearward of the supporting part 16b and closer to the rear platen 5 than the supporting part 16b along the center axis O2.

As described above, in the clamping device B1 of the injection molding machine B of the embodiment, the supported part 16a of the guide rod support 16 linked to the tie bar 6 is provided rearward of the supporting part 16b linked to the other end (tip) of the guide rod 15 and closer to the rear platen 5 than the supporting part 16b. Thus, on the occurrence of deflection at the tie bar 6 between the stationary platen 1 and the rear platen 5, displacement of the supported part 16a of the guide rod support 16 relative to the deflection of the tie bar 6 can be controlled to be low. Further, relative displacement of the supporting part 16b provided frontward of the supported part 16a and relative displacement of the guide rod 15 can be controlled to be low.

In the clamping device B1 of the injection molding machine B of the embodiment, the guide rod support 16 is provided in such a manner that an end surface 16c of the supported part 16a pointed toward the moving platen 2 is formed rearward of an end surface 16d of the supporting part 16b pointed toward the rear platen 5 and closer to the rear platen 5 than the end surface 16d along the center axis O2.

As described above, the end surface 16c of the supported part 16a of the guide rod support 16 is provided rearward of the end surface 16d of the supporting part 16b. This makes it possible to more reliably control displacement of the supported part 16a of the guide rod support 16 to be low relative to deflection of the tie bar 6. This also makes it possible to further reduce relative displacement of the supporting part 16b provided frontward of the supported part 16a and relative displacement of the guide rod 15.

The clamping device B1 of the injection molding machine B of the embodiment includes a tie bar supporting part 5a at which the platen 5 supports the tie bar 6, the supporting part 16b at which the guide rod support 16 supports the guide rod 15, and the supported part 16a at which the tie bar 6 supports the guide rod support 16. As shown in FIG. 2, a center position of the tie bar supporting part 5a along the center axis O2 is defined as a first position S1, a center position of the supporting part 16b along the center axis O2 is defined as a second position S2, and a center position of the supported part 16a along the center axis O2 is defined as a third position S3. In this case, the guide rod support 16 is provided in such a manner that a first distance L1 along the center axis O2 between the second position S2 and the third position S3 is greater than a second distance L2 along the center axis O2 between the first position S1 and the third position S3, namely, so as to establish the following relationship: the second distance L2 (distance from the first position S1 to the third position S3)<the first distance L1 (distance from the second position S2 to the third position S3).

As described above, if the guide rod support 16 is provided so as to establish the relationship of: the second distance L2<the first distance L1, an amount of deflection of the tie bar 6 at the supported part 16a of the guide rod support 16 is reduced sufficiently. Thus, relative displacement of the supported part 16a of the guide rod support 16 can be controlled to be low, making it possible to further reduce relative displacement of the supporting part 16b provided frontward of the supported part 16a and relative displacement of the guide rod 15.

Thus, in the clamping device B1 of the injection molding machine B of the embodiment, the supported part 16a of the guide rod support 16 supported by the tie bar 6 is provided rearward of the supporting part 16b supporting the other end of the guide rod 15 and closer to the rear platen 5 than the supporting part 16b. This makes it possible to effectively and favorably reduce a position deviation of the crosshead, and in turn, position deviations of the molds 3 and 4 in a pair without increasing the number of parts and without creating a more complicated structure. As a result, the clamping device B1 of the injection molding machine B to be provided can be given a high degree of reliability.

While the embodiment of the clamping device of the injection molding machine according to the present invention has been described above, the present invention should not be limited to the foregoing embodiment and can be changed, where appropriate, within a range not deviating from the substance of the invention. For example, the configuration of a toggle mechanism is not limited to that of the toggle mechanism 9 described in the foregoing embodiment.

EXPLANATION OF REFERENCE NUMERALS

1 Stationary platen
2 Moving platen
3 Stationary-side mold
4 Moving-side mold
5 Rear platen
5a Tie bar supporting part
6 Tie bar
7 Ball screw
9 Toggle mechanism
11 Driving device 13 Crosshead
15 Guide rod
16 Guide rod support
16a Supported part
16b Supporting part
16c End surface of supported part pointed toward moving platen
16d End surface of supporting part pointed toward rear platen
B Injection molding machine
B1 Clamping device of injection molding machine
O1 Axis of ball screw
O2 Center axis of clamping device
T1 Transverse direction (front-rear direction)
T2 Top-bottom direction

What is claimed is:

1. A clamping device of an injection molding machine comprising:
   a stationary platen;
   a rear platen;
   a tie bar supported by the stationary platen and the rear platen while extending through the stationary platen and the rear platen, and provided parallel to a center axis of the clamping device;
   a moving platen configured to advance and retreat under guidance by the tie bar;
   a toggle mechanism connected to both the rear platen and the moving platen and used for making the moving platen advance and retreat;
   a guide rod having one end fixed to the rear platen and the other end extending toward the moving platen;
   a guide rod support including a supported part and a supporting part, supported by the tie bar at the supported part, and supporting the guide rod at the supporting part; and
   a crosshead configured to advance and retreat under guidance by the guide rod, the advance and retreat of the crosshead expanding and contracting the toggle mechanism to make the moving platen advance and retreat, wherein
   the guide rod support is provided in such a manner that the supported part is arranged closer to the rear platen than the supporting part along the center axis.

2. The clamping device of the injection molding machine according to claim 1, wherein the guide rod support is provided in such a manner that an end surface of the supported part pointed toward the moving platen is arranged closer to the rear platen than an end surface of the supporting part pointed toward the rear platen along the center axis.

3. The clamping device of the injection molding machine according to claim 1, wherein with a center position of a tie bar supporting part along the center axis at which the rear platen supports the tie bar defined as a first position S1,
   with a center position of the supporting part along the center axis at which the guide rod support supports the guide rod defined as a second position S2, and
   with a center position of the supported part along the center axis at which the tie bar supports the guide rod support defined as a third position S3,
   the guide rod support is provided in such a manner that a first distance L1 along the center axis between the second position S2 and the third position S3 is greater than a second distance L2 along the center axis between the first position S1 and the third position S3.

* * * * *